July 2, 1935.  A. GEORGIEV  2,006,713
ELECTROLYTIC CONDENSER OR THE LIKE
Filed Nov. 21, 1931  2 Sheets-Sheet 1
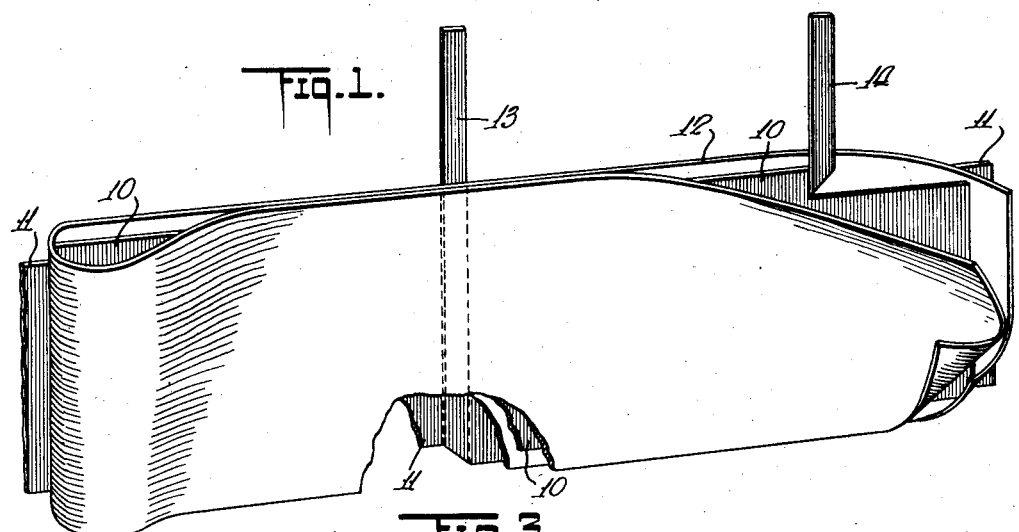
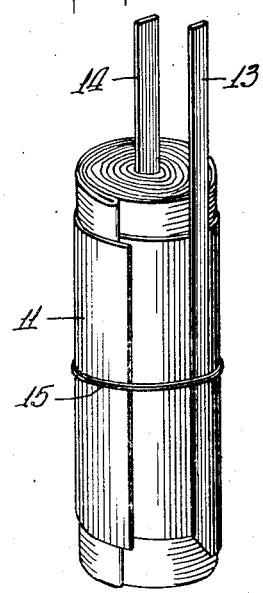
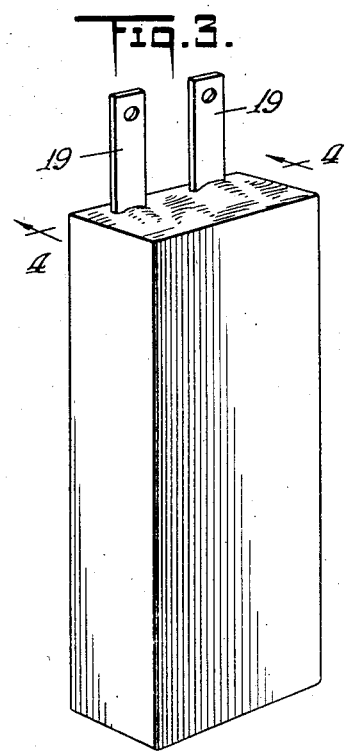
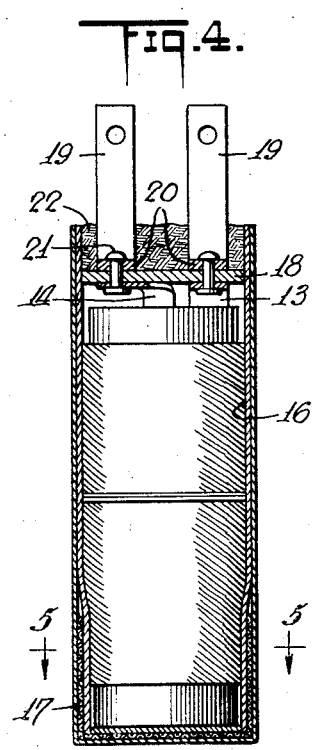
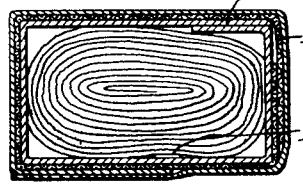
INVENTOR
Alexander Georgiev
BY
ATTORNEYS July 2, 1935. A. GEORGIEV 2,006,713
ELECTROLYTIC CONDENSER OR THE LIKE
Filed Nov. 21, 1931 2 Sheets-Sheet 2
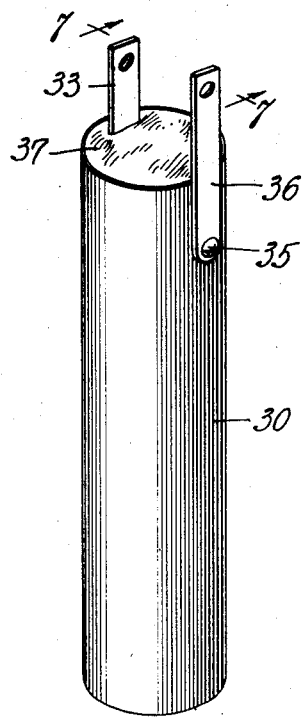
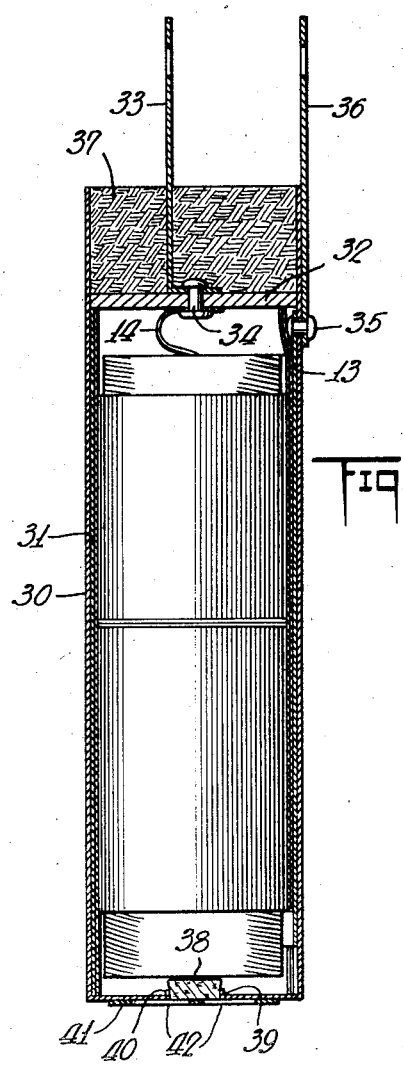
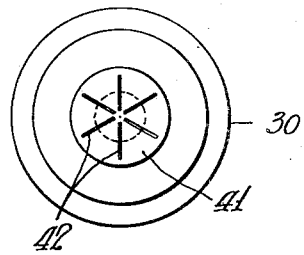
INVENTOR
Alexander Georgiev.
BY
ATTORNEYS Patented July 2, 1935

2,006,713

UNITED STATES PATENT OFFICE 2,006,713

ELECTROLYTIC CONDENSER OR THE LIKE

Alexander Georgiev, Brooklyn, N. Y., assignor to Aerovox Corporation, a corporation of New York Application November 21, 1931, Serial No. 576,473

11 Claims. (Cl. 175—315)

My present invention is primarily concerned with, and has specialized utility in the construction of electrolytically formed cells of the so-called dry type devoid of unabsorbed electrolyte liquid, and has a preferred application to electrolytically formed condensers. Certain aspects of the invention are, however, of broader application to encased electric apparatus more generally that are likely to evolve gas pressure during use.

An object of the invention is to provide an electrolytically formed cell of the above character in which the terminal facilities are of extremely inexpensive construction, as is the casing or enclosure, and yet admit of the use of an active encased element of approved construction to afford an entity entirely serviceable for many purposes, without impairment of its electric characteristics and without the likelihood of swelling or breaking due to the pressure of gas evolved in the operation of the instrument.

Another object is to provide a venting means for encased electric apparatus that evolve gas in the course of operation thereof, which venting means shall be simple, inexpensive, unlikely to become clogged and so inobtrusive as to be proof against derangement by tampering.

Another object is to provide an electrolytic cell, the interior metallic parts of which that are exposed to the electrolyte are all of aluminum while the exposed terminals are of brass or other metal that admits of soldering and in which any galvanic action between the diverse metal parts is precluded.

A feature of the invention is the use in an apparatus of the above type of a terminal prong or prongs made of metal strip or ribbon, preferably of brass, each bent to afford a toe piece, a rivet clamping a terminal tab of the active unit within the case to the lower face and the toe piece of the corresponding terminal prong to the upper face of a terminal mounting plate extending across the casing. In the application to electrolytic condensers with aluminum foils the rivet is preferably of like metal thereby to preclude galvanic action.

The terminal mounting plate is frictionally fitted into the open end of the container and is preferably sealed in place by pouring a self-hardening plastic material such as pitch into the pocket cooperatively defined by the plate and by the casing mouth. The pitch when hardened lends substantial rigidity to the entire terminal structure and prevents inadvertent or casual displacement of the terminals or accidental rupture of the electrical connections even if the condenser is carelessly handled.

The condenser roll being of the general type disclosed in my prior Patent No. 1,789,949 and having no unabsorbed liquid, the casing may be of cardboard, preferably reinforced with woven fabric, and venting of gas formed in use of the condenser readily takes place through the pores and folds of the casing.

Where a metallic case is desired affording a gas-tight seal, a special venting instrumentality is provided according to another feature of the invention and this preferably consists of a porous plug of cork or the like, fitting into an opening pressed into preferably the bottom of the can and sealed by a paper wafer, with perforated or slitted regions which may yield or tear under excess gas pressure.

The invention may be more fully understood from the following description in connection with the accompanying drawings, wherein:—

Fig. 1 is a perspective view of the foil and dielectric sheets of a condenser prior to impregnation and winding thereof. In this view, parts are broken away and in section for clearness.

Fig. 2 is a perspective view of the rolled condenser before it is introduced into the casing.

Fig. 3 is a perspective view of the casing with the condenser therein.

Fig. 4 is a vertical sectional view taken approximately on the line 4—4 of Fig. 3.

Fig. 5 is a transverse sectional view on the line 5—5 of Fig. 4.

Fig. 6 is a perspective view of a modified form of completed condenser and casing.

Fig. 7 is an enlarged longitudinal sectional view therethrough taken approximately on the line 7—7 of Fig. 6, and Fig. 8 is a bottom plan view of the condenser shown in Fig. 6.

The present invention, as suggested above, is peculiarly adapted for embodiment in an electrolytic condenser. Inasmuch however as it is primarily concerned with the mechanical features of the condenser and its housing and terminal and venting facilities rather than with the particular type of electrolyte used or the particular method of producing the electro-chemical action on the condenser plates, reference is had to my two prior Patents No. 1,789,949, issued January 20, 1931, and No. 1,815,768, issued July 21, 1931, for a more complete understanding of one method of treatment to form a self-healing high capacity active condenser unit and one specific form of electrolyte which may be used.

The condenser is made preferably of armature foils comprising an anode 10 and a cathode 11 of suitable film-forming material, preferably aluminum. An absorbent separator such as an interposed sheet 12 of gauze, paper or the like and of width greater than that of the foils and folded about the anode 10 serves to separate the anode and the cathode when the armature foils and gauze are wound together in a roll.

Of course two or more superimposed sheets of gauze or paper may be used, depending upon the nature and texture of the interlay, the character of the electrolyte and the voltages at which the apparatus is to be used. The absorbent separator should cover the total area of the anode in order to assure maximum capacity and best forming.

The cathode foil 11 is provided with a terminal tab 13 formed by slitting the foil longitudinally from one end of the sheet and bending the tongue thus formed at right angles to the longitudinal edge of the sheet. This tongue extends across the sheet and projects laterally beyond the opposite edge thereof. The opposite end of the anode foil 10 is similarly provided with a similar tab or tongue 14 cut from its opposite longitudinal edge and projecting laterally in the same direction as the tongue 13.

The superimposed layers of foil and gauze are wound together to provide a flattened roll as shown in Fig. 2 with the terminal tabs 13 and 14 of the two foil ends projecting from the end of the roll. One of these tabs projects upwardly from the center or the outside of the roll and the other extends upwardly from the outside of the roll. If desired the outer armature foil (in this instance cathode 11) may afford extra length to provide one or two extra turns about the condenser roll which is kept from unwinding by the encircling band 15. These outer turns of the cathode perform the triple function of a unitary capacitative shield, a mechanical protector for the roll during handling prior to final assembly and a superior conductor to dissipate heat generated in use.

The interlay of the condenser roll may be impregnated with a suitable electrolyte such for instance as the electrolyte disclosed in my prior Patent No. 1,815,768, and the condenser elements are then subjected to a forming operation preferably in the manner disclosed in prior Patent No. 1,789,949.

The impregnated and formed condenser roll is then placed in an open topped container 16 of cardboard or equivalent gas pervious material. This container is preferably of rectangular shape in cross section and it may be reinforced at its corners and elsewhere if desired by gauze or equivalent material 17.

A plate 18 of fibre board or similar stiff insulating material and of the same cross sectional area as the container 16 is adapted to frictionally fit within the container mouth. Terminal prongs 19 of brass strip or the like include unitary toe portions 20 bent at right angles to the main length thereof and secured to the plate 18 as by aluminum rivets 21. These rivets also pass through the terminal tabs 13 and 14 of the condenser roll within the casing. In practice the plate 18 together with the prongs 19 are riveted to tabs 13 and 14 before the condenser roll is inserted into the container and when the roll is inserted the plate 18 is frictionally forced after it into the mouth of the container.

The plate cooperates with the container mouth to form a socket in which the inner ends of terminal prongs 19 are disposed and the inner ends of these prongs are then embedded in a body of pitch bitumen or similar material 22 poured onto the plate 18 in sufficient quantity to come substantially flush with the top of the container.

The aluminum rivets 21 firmly retained in the fibre plate and embedded in the pitch, effect a liquid-tight seal between the interior of the condenser enclosure and the terminal prongs 19. Thus while the metallic parts within the casing are all of aluminum for the avoidance of any galvanic action, the exposed parts are not of aluminum but of a metal that admits of soldering connection and are yet protected from the corrosive action of electrolyte thereon.

Inasmuch as there is no unabsorbed liquid within the casing 14, the cardboard container which is impregnated in wax will not become soaked with electrolyte and it may be disposed at any angle with respect to its associated apparatus and will function equally well either in the position illustrated or inverted position or on its side or at any desired angle. The condenser, from an electrical standpoint, may embody all of the advantages of the more expensive types of construction in which the inventions of my prior patents have been previously embodied.

One characteristic of a condenser constructed in the manner above described is the fact that the casing is self venting without the provision of any special vent means. Gas evolved during operation of the condenser will leak out of the casing through the corners and through the gauze and to some extent through the pervious cardboard itself and the generation of excessive pressure within the casing will be entirely avoided. Similarly the electrolyte will be kept moist by the inbreathing of air.

The present embodiment it will be seen thus involves merely a cardboard casing, and fibre terminal mount, and prongs of brass strip and rivets in addition to the enrolled active unit and the performance of this condenser is satisfactory and its durability substantial though its cost is low.

In Figs. 6 to 8 inclusive is illustrated another simple form of condenser in which the condenser roll may be identical with the roll illustrated in Figs. 1 to 5.

In this instance the casing member 30 comprises an open topped cylindrical metallic can having if desired a cardboard or paper liner 31. A fiber disc 32 corresponding to the plate 18 may be frictionally fitted within the mouth of the container to an extent limited by the can lining 31. This disc carries only one terminal prong 33 which is riveted as at 34 to the terminal tab 14 of the anode foil. The other terminal tongue 13 is secured by a self-sealing aluminum rivet 35 to the side wall of the can near the top thereof, this rivet serving to secure in place a brass strip terminal prong 36 which lies along the side of the can 30 and extends thereabove parallel to and to the same height as the terminal prong 33. In this case again the terminal prong 33 is embedded in the pitch or bitumen 37 which is poured into the top of the can onto plate 32 in sufficient quantity to form a plug lying flush with the can top.

With this form of condenser the self-sealing rivet 35 prevents venting and the can is of course impervious to gas. I have therefore devised an extremely simple and efficient means for permitting the can to vent and breathe through its bottom.

The venting means includes a small disk or plug 38 of cork, sponge rubber or equivalent material fitting within a circular opening formed at the bottom of the can. The plug is preferably held in position by a lip or flange 40 pressed inwardly as an incident of forming the opening 39 and the condenser roll may rest directly on the plug.

The opening 39 and the plug 38 are entirely concealed by a wafer 41 of paper pasted against the bottom of the can and weakened as by a series of non-communicating radial slits 42 therein. These slits terminate short of the periphery of the disk, and short of the center, of the disk. Gas passing through the cork 38 thus finds a ready escape to the air. In practice the slits 42 are very narrow and quite inconspicuous.

The wafer being preferably finished with aluminum paint to match the color of the can, it does not invite tampering and the can presents no protuberance or other irregularity that interferes with proper installation.

In operation gas pressure evolved in use is readily relieved through the porous cork plug and the perforated paper wafer. Should, however, excessive pressure be generated suddenly due for instance to improper connection of the condenser across terminals of excessive tension, the paper wafer will readily yield or tear and permit the cork plug to be blown out.

The venting construction set forth while especially suitable in the electric cell or condenser construction set forth, has a wide range of applicability to electric apparatus for other purposes which are enclosed and which in use are apt to evolve gas pressure that must be relieved to prevent damage to the apparatus.

Both embodiments of condenser disclosed herein are readily put in circuit by plugging the flat terminal prongs thereof into a corresponding socket in the same manner as in the case of an ordinary quick-detachable electric plug, or by soldering leads from other associated apparatus to the terminal. Even the inexpensive paper embodiment admits of relatively rough handling, the pitch closure acting as a reinforce for the casing itself, and steadying the protruding prongs.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. In apparatus of the character described, a gas pervious casing having an open end, an active electrolytic cell unit therein of the type having its electrolyte absorbed therein, said casing being otherwise substantially devoid of filling and presenting air voids therein, means effecting a substantially gas-tight closure for the open end of the casing, and terminal structures protruding through said means.

2. In a condenser of the character described, a casing open at one end, a rolled electrolytic condenser unit within the casing having electrolyte absorbed therein, said casing being otherwise substantially devoid of filling and presenting air voids therein, a plate of insulating material fitting within and closing the open end of the casing and having terminal elements unitary therewith, means connecting said terminal elements to the electrodes of the condenser, said plate cooperating with the casing mouth to define a pocket, and a hardened plastic material filling said pocket, sealing the end of the casing and embedding a portion of the terminal structures, said casing being so constructed that it may breathe.

3. A condenser as set forth in claim 2 wherein the casing is of cardboard, the breathing occurring due to the construction at certain corners thereof.

4. A condenser as set forth in claim 1 wherein the casing is of gas pervious material including cardboard and having gauze at its interfolded corners.

5. An electrolytic condenser including a casing open at one end and a condenser roll loosely fitting within the casing, means effecting a gas tight closure for the end of the casing and affording terminal connections at said closure for the condenser roll, said casing being of cardboard and including at least one gas pervious joint apart from said gas tight closure.

6. Means for venting the gas impervious casing of an electrolytic condenser including an end having a gas pervious plug mounted in an opening in the condenser casing and a gas pervious sheet of material secured to the outer surface of the casing and concealing said opening.

7. Means for venting the gas impervious casing of an electrolytic condenser including a gas pervious element mounted in an opening in the condenser casing and a slitted sheet of paper secured to the outer surface of the casing and concealing said opening.

8. A condenser as set forth in claim 6 wherein the condenser casing is of elongated conformation and the opening is arranged in an end thereof and the sheet is a paper wafer having non-intersecting radial slits arranged inwardly of the edges of the disk.

9. An electrolytic condenser including a casing of conductive material and a condenser roll therein, a closure plate of non-conductive material sealed within the open end of the casing, a terminal carried by the plate and connected by riveting to an armature of the condenser, a second terminal projecting beyond the end of the casing parallel with the first mentioned terminal and riveted through the casing to the other condenser roll armature and means for venting the casing through its closed end comprising a vent opening having a cork therein and a slitted wafer concealing the opening and the cork.

10. An article of the character described including a gas pervious fibrous casing having an open end, a rolled electrolytic condenser within the casing, of the type having its electrolyte absorbed, said casing presenting air voids about said rolled condenser a fibrous closure plate fitting within the mouth of the casing and cooperating therewith to define a pocket, terminal prongs projecting from beyond the end of the casing and comprising metal strips including toe portions riveted through said plate to extensions of the respective condenser armatures and normally non-plastic material poured into the pocket while in plastic condition and sealing the container mouth and embedding the inner ends of the prong strips.

11. An electrolytic cell including an active element, all of the conducting parts of which are of identical metal of type not readily solderable, a casing for said element, said element having an exposed prong of a metal differing from that of said element and admitting of soldering, a liquid-tight insulating closure means including a plate against opposite sides of which the prong and active element are pressed, said closure preventing the access of electrolyte from within the enclosure to the exposed terminals, said casing having venting means apart from said insulating closure means.

ALEXANDER GEORGIEV.